United States Patent
Yamamoto

(10) Patent No.: US 11,310,197 B2
(45) Date of Patent: Apr. 19, 2022

(54) IP ADDRESS USE AREA IDENTIFYING SYSTEM

(71) Applicant: Geolocation Technology, Inc., Mishima (JP)

(72) Inventor: Keisuke Yamamoto, Mishima (JP)

(73) Assignee: Geolocation Technology, Inc., Mishima (JP)

( * ) Notice: Subject to any disclaimer, the term of this patent is extended or adjusted under 35 U.S.C. 154(b) by 0 days.

(21) Appl. No.: 17/298,524

(22) PCT Filed: Dec. 3, 2018

(86) PCT No.: PCT/JP2018/044408
§ 371 (c)(1),
(2) Date: May 28, 2021

(87) PCT Pub. No.: WO2020/115796
PCT Pub. Date: Jun. 11, 2020

(65) Prior Publication Data
US 2021/0359975 A1    Nov. 18, 2021

(51) Int. Cl.
*G06F 15/16* (2006.01)
*H04L 101/69* (2022.01)
*H04L 61/5007* (2022.01)

(52) U.S. Cl.
CPC ........ *H04L 61/609* (2013.01); *H04L 61/2007* (2013.01)

(58) Field of Classification Search
USPC ................... 709/245, 238, 239, 242
See application file for complete search history.

(56) References Cited

U.S. PATENT DOCUMENTS 7,961,717 B2    6/2011  Lee et al.
7,983,691 B1 *  7/2011  Wong ...................... H04W 4/02
                                                    455/456.1
(Continued)

FOREIGN PATENT DOCUMENTS

JP    2002-198997 A    7/2002
JP    2008-545122 A    12/2008
(Continued)

*Primary Examiner* — Lan Dai T Truong
(74) *Attorney, Agent, or Firm* — Polsinelli PC

(57) ABSTRACT

Provided is an IP address use area identifying system, including: a communication path detection unit 11 detecting a communication path including router passing information; and an area identifying unit 12 identifying an area from an IP address of a router located at an end of the detected communication path, with reference to IP address use area information in which the IP address is associated with the area in which the IP address is used, in which when the area identifying unit 12 identifies the area, an extent of the area identified from the IP address is varied on the basis of the number of routers included in the detected communication path, by utilizing a network characteristic that the number of routers to be passed through when a communication path can be detected up to a transmission source user terminal (up to a terminal end of the communication path) becomes a prescribed number, and thus, even when the communication path is not capable of being traced up to the transmission source user terminal, the area based on the IP address of the router located at the end of the detected communication path can be identified, in an extent corresponding to the number of routers included in the communication path up to the farthest traceable point.

2 Claims, 3 Drawing Sheets

(56) References Cited

U.S. PATENT DOCUMENTS

| | | | |
|---|---|---|---|
| 8,316,114 B2 | 11/2012 | Peng | |
| 8,428,098 B2 | 4/2013 | Chen et al. | |
| 8,867,531 B2 | 10/2014 | Lee et al. | |
| 9,129,293 B2 | 9/2015 | Perez et al. | |
| 9,319,519 B2 | 4/2016 | Lee et al. | |
| 9,661,134 B2 | 5/2017 | Lee et al. | |
| 10,484,277 B2 | 11/2019 | Perez et al. | |
| 2003/0074471 A1* | 4/2003 | Anderson | H04L 29/12009 709/245 |
| 2007/0030841 A1 | 2/2007 | Lee et al. | |
| 2007/0211664 A1* | 9/2007 | Oyama | H04W 36/10 370/331 |
| 2008/0010367 A1* | 1/2008 | Chen | H04W 64/00 709/223 |
| 2010/0191723 A1 | 7/2010 | Perez et al. | |
| 2011/0153681 A1 | 6/2011 | Peng | |
| 2011/0206039 A1 | 8/2011 | Lee et al. | |
| 2013/0007256 A1 | 1/2013 | Prieditis | |
| 2013/0135147 A1 | 5/2013 | Lee et al. | |
| 2015/0009986 A1 | 1/2015 | Lee et al. | |
| 2015/0381490 A1 | 12/2015 | Perez et al. | |
| 2016/0381218 A1 | 12/2016 | Lee et al. | |
| 2020/0195554 A1 | 6/2020 | Perez et al. | |

FOREIGN PATENT DOCUMENTS

| | | |
|---|---|---|
| JP | 2009-543075 A | 12/2009 |
| JP | 2010-114657 A | 5/2010 |
| JP | 2012-516514 A | 7/2012 |
| JP | 2013-514582 A | 4/2013 |
| JP | 2016-178644 A | 10/2016 |

* cited by examiner

IP ADDRESS USE AREA IDENTIFYING SYSTEM

CROSS REFERENCE TO RELATED APPLICATIONS

This application is a National Phase filing under 35 U.S.C. § 371 of PCT/JP2018/044408 filed on Dec. 3, 2018, the entire contents of which are hereby incorporated by reference.

TECHNICAL FIELD

The present invention relates to an IP address use area identifying system, and in particular, is preferable for use in a system for identifying an area in which an IP address is used.

BACKGROUND ART

In the related art, a technology of identifying an area in which a user terminal is used (that is, an area in which an IP address is used), on the basis of the IP address of the user terminal, has been known (for example, refer to Patent Document 1). In an area information determination system described in Patent Document 1, basic information indicating association between an IP address and a specific area is collected, and area information of the IP address is set by using the collected basic information.

In addition, in the area information determination system described in Patent Document 1, area information of an IP address in which the area information is not capable of being set is estimated. The IP address in which the area information is not capable of being set indicates an IP address in which it is difficult to directly set area information in a case where there is no basic information indicating association with an specific area or there is no sufficient basic information or in a case where there are a plurality of basic information items indicating association with areas different from each other with respect to the same IP address.

That is, in the area information estimation unit described in Patent Document 1, the area information of the IP address is estimated by using an IP address group (an IP subnetwork that is an IP allocation reference) including a plurality of IP addresses. Specifically, in a case where a representative area is set for each IP address group, and area information of a certain IP address is not capable of being uniquely set from the basic information, the representative area set in the IP address group to which the IP address belongs is estimated as the area information of the certain IP address.

By the way, in order to utilize the IP address of the user terminal to identify a use area of a transmission source user terminal, first, it is necessary to detect an IP address of the transmission source user terminal. In this context, in the related art, a technology of acquiring router passing information by executing a path search command and of detecting a communication path by identifying an IP address of a router has been known (for example, refer to Patent Document 2).

That is, in a communication path detection device described in Patent Document 2, passing information indicating which router is passed through is acquired by executing the path search command for searching a communication path from a device A to a device B, in a layer 3 (a network layer) of an open systems interconnection (OSI) reference model. Then, a communication path of a layer 3 network is detected by identifying the IP address of the router by collating the passing information with virtual router redundancy protocol (VRRP) information retained in a memory.

In a case where an IP address of a router directly below the transmission source user terminal is detected by tracing the router passing information detected by using the technology described in Patent Document 2, and the technology described in Patent Document 1 is applied by using the detected IP address, an area in which the transmission source user terminal is used (accurately, the area is an area in which the router directly below the user terminal is installed, but the user terminal and the router directly below the user terminal are installed adjacent to each other and are definitely in the same area, and thus, herein, the area will be described as the "area of the user terminal") can be identified.

Patent Document 1: JP-A-2016-178644
Patent Document 2: JP-A-2010-114657

SUMMARY OF THE INVENTION

Technical Problem

However, there is a case where the communication path is not capable of being traced up to the transmission source user terminal (accurately, the router directly below the user terminal) even in a case where the path search command is executed. That is, there may be a case where the communication path can be traced up to the middle of the communication path toward the transmission source user terminal from a terminal that has issued the path search command, but the communication path is not capable of being traced from the middle. In such a case, the IP address of the transmission source user terminal (the IP address of the router directly below the user terminal) is not capable of being detected, and thus, the area in which the user terminal is provided is not capable of being identified.

The invention has been made in order to solve such problems, and an object thereof is to provide a method of identifying an area based on an IP address in a case where a communication path is not capable of being traced up to a transmission source user terminal.

Solution to Problem

In order to attain the object described above, in the invention, a communication path including router passing information is detected by executing a path search command, and an area is identified from an IP address of a router located at the end of the detected communication path, with reference to an area database storing IP address use area information in which an IP address is associated with an area in which the IP address is used. When identifying the area, the extent of the area identified from the IP address is varied on the basis of the number of routers included in the detected communication path.

Advantageous Effects of the Invention

According to the invention configured as described above, an area of which the extent is variable on the basis of the number of routers included in the detected communication path is identified by utilizing a network characteristic that the number of routers to be passed through when a communication path can be detected up to a transmission source user terminal (up to a terminal end of the communication path) becomes a prescribed number when a communication path is detected by executing a path search command. For this reason, even in a case where the communication path is not capable of being traced up to the transmission source user terminal, an area based on an IP address of a router located at the end of the detected communication path can be identified, in an extent corresponding to the number of routers included in the communication path up to the farthest traceable point.

MODE FOR CARRYING OUT THE INVENTION

Figure 1:
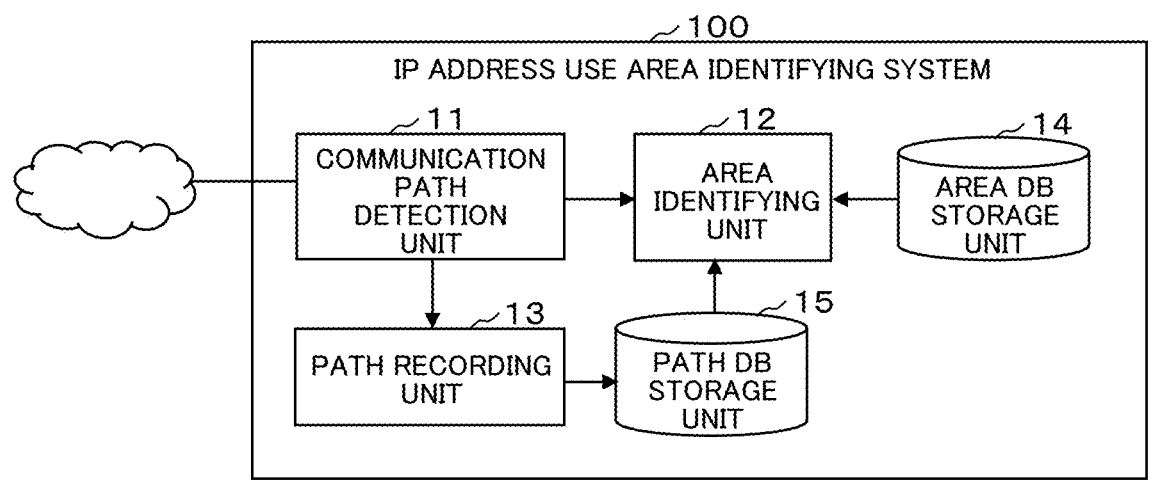
FIG. 1 is a block diagram illustrating a function configuration example of an IP address use area identifying system according to this embodiment.

Hereinafter, one embodiment of the invention will be described on the basis of the drawings. FIG. 1 is a block diagram illustrating a function configuration example of an IP address use area identifying system 100 according to this embodiment (hereinafter, simply referred to as a use area identifying system). As illustrated in FIG. 1, the use area identifying system 100 of this embodiment includes a communication path detection unit 11, an area identifying unit 12, and a path recording unit 13, as a function configuration.

Each of the function blocks 11 to 13 described above can be configured by any of hardware, a digital signal processor (DSP), and software. For example, each of the function blocks 11 to 13 described above actually includes a CPU, a RAM, a ROM, and the like of a computer in the case of being configured by software, and is attained by operating a program stored in a recording medium such as a RAM or a ROM, a hard disk, or a semiconductor memory.

In addition, the use area identifying system 100 of this embodiment includes an area database storage unit 14 and a path database storage unit 15, as a storage medium. Note that, in the use area identifying system 100, each function of the communication path detection unit 11, the area identifying unit 12, and the path recording unit 13 may be provided in a server device or a personal computer, and each function of the area database storage unit 14 and the path database storage unit 15 may be provided in an external data server.

The area database storage unit 14 stores in advance IP address use area information in which an IP address is associated with an area in which the IP address is used, as an area database. The area in which the IP address is used is identified in advance by preliminary examination using a known method.

The area stored in association with the IP address, for example, is an area that is identified in the extent of the prefectural unit. In this case, the IP address use area information is information indicating that each IP address is used somewhere in each prefecture. For example, in a case where "Tokyo" is associated with a certain IP address, it is indicated that the IP address is used somewhere in Tokyo Prefecture.

Note that, the extent of the area stored in association with the IP address is not limited to the extent of the prefectural unit. For example, an area that is identified in the municipal unit may be stored in the use area identifying system 100 in association with an IP address.

The communication path detection unit 11 detects a communication path including router passing information by executing a path search command. The communication path can be detected by applying a known technology. For example, a communication path between a transmission source host and a transmission destination host when certain communication is performed on the Internet can be obtained by executing a traceroute command of Unix (Registered Trademark) (in Windows (Registered Trademark), a tracert command). Here, the communication path is passing information of a plurality of routers connecting the hosts.

For example, the communication path detection unit 11 designates a transmission destination host and executes the path search command, and thus, searches a communication path from the designated transmission destination host up to the transmission source host in a direction opposite to a transmission direction and acquires router passing information existing on the communication path. In the router passing information, an IP address of each router is included. Accordingly, an IP address used for identifying an area in which a transmission source user terminal (a router directly below the transmission source user terminal) is used can be detected.

The area identifying unit 12 identifies an area from an IP address of a router located at the end of the communication path that is detected by the communication path detection unit 11, with reference to the area database that is stored in the area database storage unit 14. In the case of searching the communication path in the opposite direction toward a transmission source from a transmission destination, the router located at the end of the communication path is essentially the router installed directly below the transmission source user terminal. Therefore, identifying the area from the IP address of the router located at the end of the communication path corresponds to identifying the area in which the transmission source user terminal is used.

Figure 2:
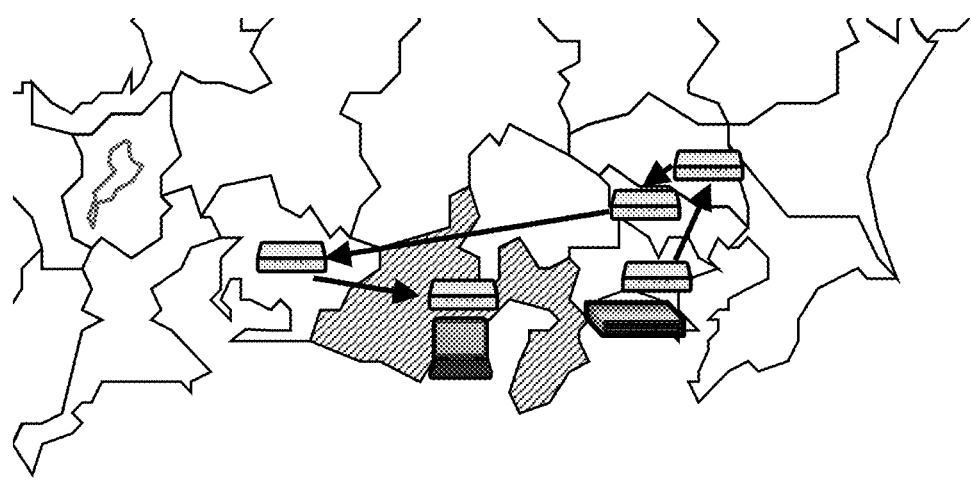
FIG. 2 is a diagram illustrating an example of a communication path that is detected by a communication path detection unit and an area that is identified by an area identifying unit.

FIG. 2 is a diagram illustrating an example of the communication path that is detected by the communication path detection unit 11 and the area that is identified by the area identifying unit 12. In communication performed from a transmission source host (for example, a user terminal) in Shizuoka Prefecture up to a transmission destination host (for example, a server device) in Kanagawa Prefecture, processing results of the communication path detection unit 11 that searches a communication path in an opposite direction toward the transmission source user terminal from the transmission destination server device are illustrated in the example of FIG. 2. Passing information of such communication path includes IP addresses of each of routers in Kanagawa Prefecture, Saitama Prefecture, Tokyo Prefecture, Aichi Prefecture, and Shizuoka Prefecture in the order from the transmission destination to the transmission source.

In FIG. 2, the router located at the end of the communication path is the router installed in Shizuoka Prefecture. From the IP address of the router located at the end of the communication path detected by the communication path detection unit 11, the area identifying unit 12 identifies "Shizuoka Prefecture" that is an area associated with the IP address, with reference to the area database that is stored in the area database storage unit 14. Accordingly, it is possible to recognize that the transmission source user terminal using the router located at the end of the communication path directly below the transmission source user terminal exists in Shizuoka Prefecture.

Figure 3:
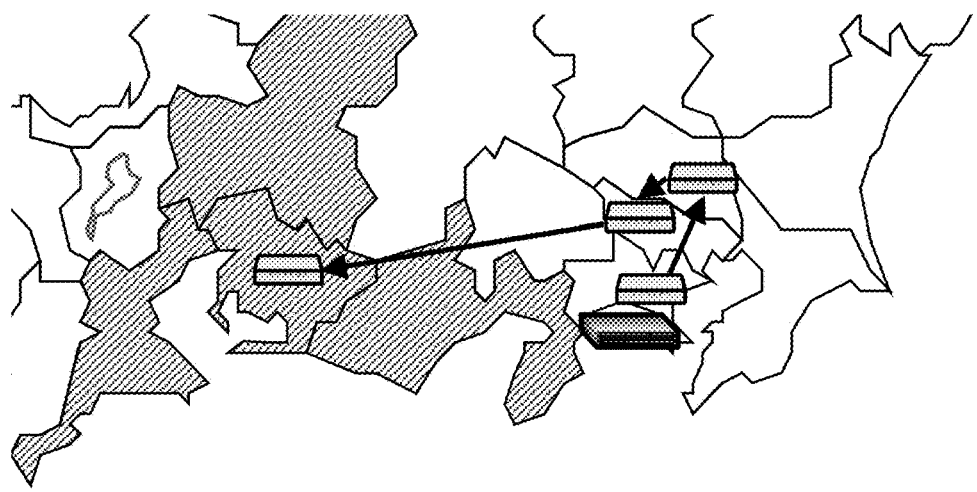
FIG. 3 is a diagram illustrating another example of the communication path that is detected by the communication path detection unit and the area that is identified by the area identifying unit.

Here, the reason why the router located at the end of the communication path is "essentially" the router installed directly below the transmission source user terminal is that there is an exception. As illustrated in FIG. 3, the exception is a case where the communication path up to the transmission source user terminal (the router directly below the transmission source user terminal) is not capable of being traced even when the path search command is executed. In such a case, the area identifying unit 12 identifies the area in which the transmission source user terminal is used, in the range of the communication path that can be traced.

That is, the area identifying unit 12 varies the extent of the area identified from the IP address, on the basis of the number of routers included in the communication path detected by the communication path detection unit 11. Here, the area identifying unit 12 increases the extent of the area identified from the IP address as the number of routers included in the communication path detected by the communication path detection unit 11 decreases.

FIG. 3 illustrates a state in which the number of routers included in the communication path detected by the communication path detection unit 11 is 4, and an area is identified in an extent corresponding to the number of 4 (the identified area is illustrated by hatching). As it is obvious from the comparison with FIG. 2, the extent of the area that is identified in a case where the number of routers included in the detected communication path is 4 is wider than the extent of the area (Shizuoka Prefecture) that is identified in a case where the number of routers included in the communication path detected by the communication path detection unit 11 is 5.

In a case where communication is performed on the Internet in Japan, the number of routers to be passed through from the transmission source host up to the transmission destination host is fixed. Therefore, the area identifying unit 12 is capable of recognizing that the communication path could be traced up to the transmission source user terminal in a case where the number of routers included as the passing information in the communication path detected by the communication path detection unit 11 is a prescribed number (in this embodiment, described as 5 illustrated in FIG. 2), whereas the area identifying unit 12 is capable of recognizing that the communication path could not be traced up to the transmission source user terminal in a case where the number of routers included as the passing information in the communication path is less than the prescribed number.

Then, in a case where it is recognized that the communication path could not be traced up to the transmission source user terminal, the area identifying unit 12 identifies an area in an extent corresponding to the number of routers included in the communication path, on the basis of the IP address of the router located at the end of the communication path (a communication path up to the middle not reaching the transmission source user terminal). At this time, the area identifying unit 12 identifies an area that widens as the number of routers included in the communication path decreases.

Specifically, the area identifying unit 12 identifies an area associated with the IP address of the router located at the end of the communication path up to the middle (an area of the prefectural unit), with reference to the area database. Then, the area identifying unit 12 identifies an area in a range that includes the identified prefecture and is wider than the prefectural unit. The range wider than the prefectural unit, for example, is the extent of the district unit such as Kanto District or Tohoku District, the extent of the district group unit such as Western Japan or Eastern Japan, and the extent of the country unit such as all parts of Japan.

Figure 4:
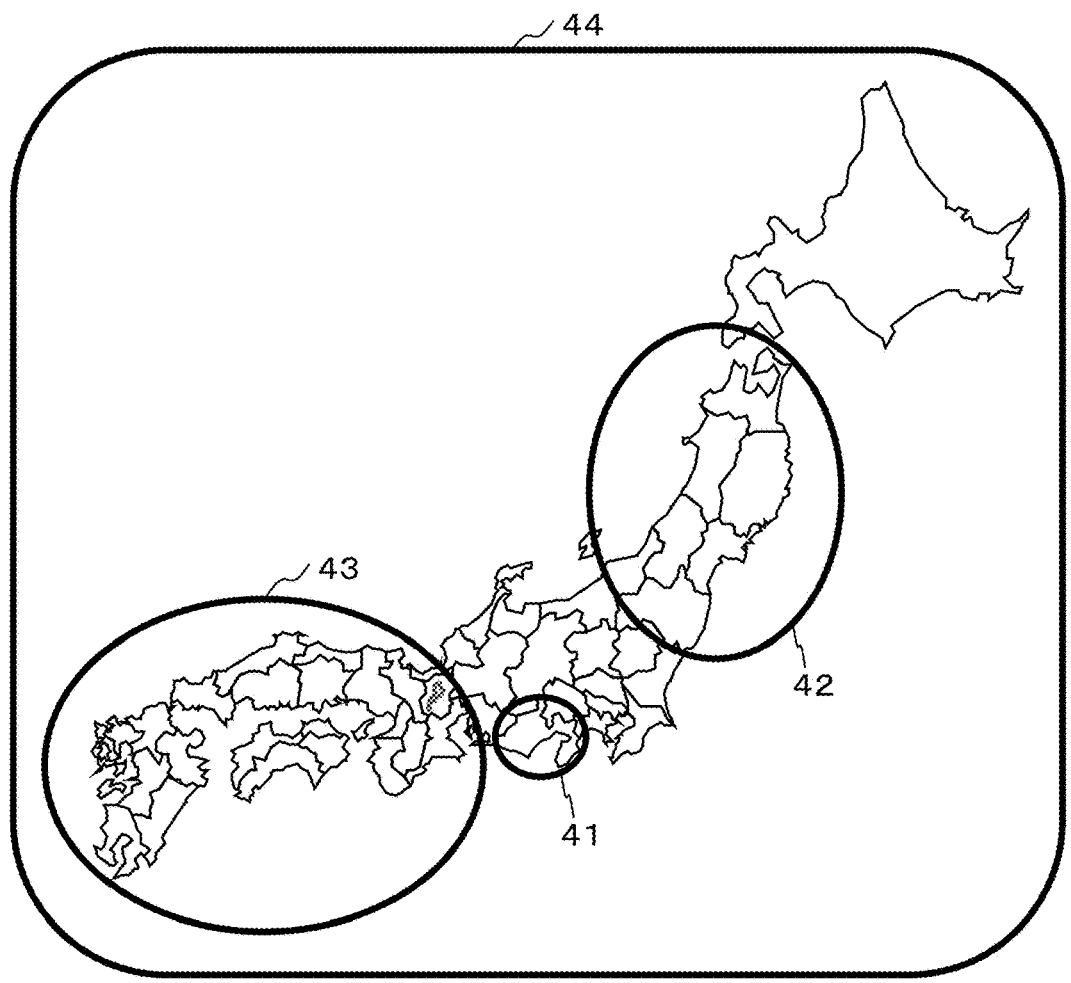
FIG. 4 is a diagram exemplifying an extent of an area identified corresponding to the number of routers included in the communication path detected by the communication path detection unit.

FIG. 4 is a diagram exemplifying the extent of the area identified corresponding to the number of routers included in the communication path detected by the communication path detection unit 11. In a case where the number of routers included in the communication path detected by the communication path detection unit 11 is the prescribed number (5), the area identifying unit 12 identifies an area 41 of the prefectural unit (for example, Shizuoka Prefecture) that is stored in the area database. On the other hand, in a case where the number of routers included in the communication path is less than the prescribed number, the area identifying unit 12 identifies areas 42 to 44 wider than the area of the prefectural unit that are stored in the area database, and at this time, the extent of the area that is identified increases as the number of routers included in the communication path decreases.

FIG. 4 illustrates an example in which the area 42 of the district unit (for example, Tokai District) is identified in a case where the number of routers included in the communication path is 4, the area 43 of the district group unit (for example, Western Japan) is identified in a case where the number of routers included in the communication path is 3, and the area 44 of the country unit (for example, all parts of Japan) is identified in a case where the number of routers included in the communication path is 2 or less. In the example of FIG. 3, a state is illustrated in which the number of routers included in the communication path detected by the communication path detection unit 11 is 4, and "Aichi Prefecture" is identified with reference to the area database, on the basis of the IP address of the router located at the end of the communication path, and thus, "Tokai District" is identified as the area of the district unit including Aichi Prefecture.

In a case where communication is performed on the Internet while passing through a plurality of routers, the communication tends to be performed while sequentially passing through routers at a comparatively close distance. Therefore, in a case where the number of routers to be passed through increases, it is possible to estimate that the transmission source user terminal exists at a place in a certain range from the location of the router at the end of the communication path up to the middle even when the communication path reaching the transmission source user terminal is not capable of being traced up to the end. On the other hand, in a case where the number of routers included in the communication path that can be detected is small, it is not determined in which direction the router is passed through from the router at the end of the communication path up to the middle, and thus, a range that can be estimated as the place in which the transmission source user terminal exists widens. In this embodiment, such properties are utilized, and thus, the area in the extent corresponding to the number of routers included in the communication path detected by the communication path detection unit 11 is identified.

As described above, in a case where the number of routers included the communication path detected by the communication path detection unit 11 is less than the prescribed number, the extent of the identified area is wider than the prefectural unit. Here, it is preferable that the area can be identified in as narrow range as possible (a range similar to the prefectural unit). In this embodiment, this can be attained by using the path recording unit 13 and the path database storage unit 15.

The path recording unit 13 stores information of the communication path detected by the communication path detection unit 11 in a path database of the path database storage unit 15, every time the communication path is detected. The information of the communication path that is stored in the path database is information relevant to each of the routers included in the communication path and the IP addresses used in each of the routers. The information of the communication path that is stored in the path database also includes a communication path in a case where the communication path is not capable of being traced up to the transmission source user terminal (a communication path in which the number of routers to be passed through is 4 or less), in addition to the communication path in a case where the communication path can be traced up to the transmission source user terminal (the communication path in which the number of routers to be passed through is 5).

In a case where the number of routers included in the communication path detected by the communication path detection unit 11 (hereinafter, referred to as a detection path) is less than the prescribed number, the area identifying unit 12 identifies an area in an extent excluding a prescribed area, in the area in the extent corresponding to the number of routers. The excluded area is an area corresponding to an IP address of a router located on a path that is ahead of the end of the detection path, in the communication path that is stored in the path database (hereinafter, referred to as a history path) and is partially common to the detection path. The history path partially common to the detection path indicates that the history path includes all routers of the detection path, and further includes other routers.

Figure 5:
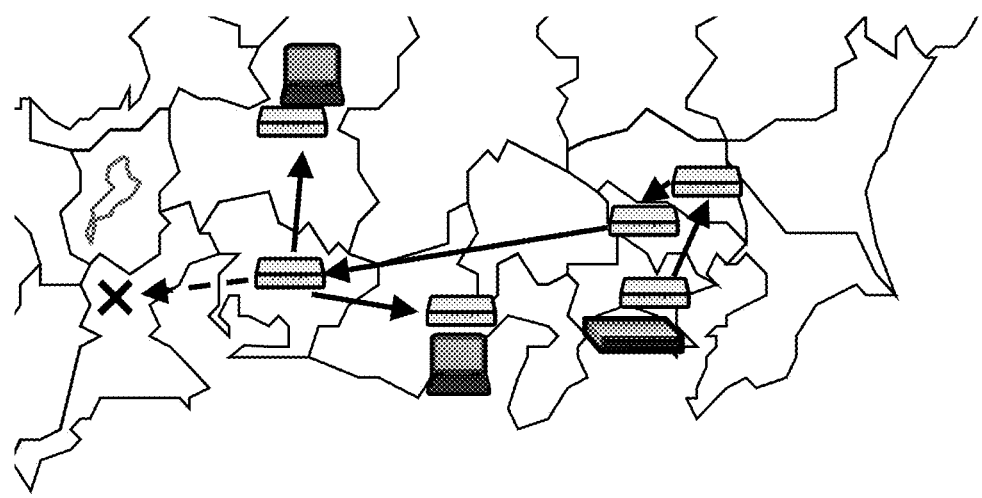
FIG. 5 is a diagram illustrating an example of a communication path (a history path) that is stored in a path database.

FIG. 5 is a diagram for describing the operation of the area identifying unit 12 described above, and is a diagram illustrating an example of the communication path (the history path) that is stored in the path database. FIG. 5 illustrates an example in which a communication path passing through each router in Kanagawa Prefecture, Saitama Prefecture, Tokyo Prefecture, Aichi Prefecture, and Gifu Prefecture, and a communication path passing through each router in Kanagawa Prefecture, Saitama Prefecture, Tokyo Prefecture, Aichi Prefecture, and Shizuoka Prefecture are stored as the history path in the path database.

It is assumed that a communication path that is newly detected by the communication path detection unit 11 is the communication path as illustrated in FIG. 3 in the state where the history path as illustrated in FIG. 5 is stored in the path database. That is, it is assumed that the number of routers included in the communication path detected by the communication path detection unit 11 (the detection path) is 4 which is less than the prescribed number, and four routers are provided in Kanagawa Prefecture, Saitama Prefecture, Tokyo Prefecture, and Aichi Prefecture, respectively.

In this case, two history paths illustrated in FIG. 5 are a communication path that is partially common to the detection path illustrated in FIG. 3 (the part of Kanagawa Prefecture, Saitama Prefecture, Tokyo Prefecture, and Aichi Prefecture). Then, in the history path, the router located on the path that is ahead of the end of the detection path is the router in Gifu Prefecture and the router in Shizuoka Prefecture. Accordingly, the area identifying unit 12 identifies an area in an extent excluding an area corresponding to each IP address of the router in Gifu Prefecture and the router in Shizuoka Prefecture (Gifu Prefecture and Shizuoka Prefecture), in Tokai District that is an area identified corresponding to four routers. That is, an area in a range including two prefectures of Aichi Prefecture and Mie Prefecture is identified.

The reason for excluding the area corresponding to the IP address of the router located on the path that is ahead of the end of the detection path (Gifu Prefecture and Shizuoka Prefecture) in the history path is that it can be said that the router ahead of the end of the detection path is highly likely to be a router in an area not in the history path (Aichi Prefecture and Mie Prefecture). That is, the history path indicates that the path has been actually detected. In a case where the current detection path is identical to the history path, it is obvious that the current communication path is highly likely to be detected in the same manner as the history path. However, in actuality, the communication path identical to the history path is not detected. Accordingly, it is considered that the current detection path is highly likely to be different from the history path. For this reason, the area identifying unit 12 identifies the area in the range excluding the area corresponding to the IP address of the router located on the path that is ahead of the end of the detection path, in the history path. Accordingly, in the area in the extent identified corresponding to the number of routers included in the detected communication path, an area in as narrow range as possible can be identified.

Here, a case where the number of routers included in the communication path detected by the communication path detection unit 11 is 4 has been exemplified, but the same applies to a case where the number of routers is 3 or less. For example, in a case where the number of routers included in the detected communication path is 3, the range of an area identified corresponding to three routers is the district group unit such as Western Japan, Eastern Japan, or Northern Japan. For example, in a case where an area identified from an IP address of a router at the end in three routers is Eastern Japan, the area identifying unit 12 identifies an area in an extent excluding a district including an area corresponding to an IP address of the fourth router that is represented by one or more history paths partially including a path common to the detection path, in each district included in the area such as Eastern Japan. Note that, in each prefecture included in the area such as Eastern Japan, an area in an extent excluding a prefecture corresponding to each IP address of the fourth and the subsequent routers that are represented by one or more history paths including a path common to the detection path may be identified.

Note that, in a case where there are no areas to be identified at the time of excluding the area corresponding to the IP address of the router located on the path ahead of the end of the detection path in history path, the processing of excluding the area by using the history path is not performed, and the area in the extent corresponding to the number of routers included in the detection path is identified as usual.

As described above in detail, in this embodiment, the communication path detection unit 11 detects the communication path including the router passing information by executing the path search command, and the area identifying unit 12 identifies the area from the IP address of the router located at the end of the detected communication path, with reference to the area database storing the IP address use area information. Here, in a case where the number of routers included in the communication path detected by the communication path detection unit 11 is less than the prescribed number, the extent of the area identified from the IP address is varied on the basis of the number of routers included in the detection path when the area identifying unit 12 identifies the area.

According to this embodiment configured as described above, an area of which the extent is variable can be identified on the basis of the number of routers included in the detection path, by utilizing a network characteristic that the number of routers to be passed through when the communication path can be detected up to the transmission source user terminal (up to the terminal end of the communication path) becomes the prescribed number. For this reason, even in a case where the communication path is not capable of being traced up to the transmission source user terminal, the area based on the IP address of the router located at the end of the detection path can be identified, in the extent corresponding to the number of routers included in the communication path up to the farthest traceable point.

In addition, in this embodiment, in a case where the number of routers included in the detection path is less than the prescribed number, in the area in the extent corresponding to the number of routers, the area in the extent excluding the area corresponding to the IP address of the router located on the path ahead of the end of the detection path in the history path stored in the path database is identified. Accordingly, in the area in the extent identified corresponding to the number of routers included in the detection path, the area in as narrow range as possible can be identified.

Note that, in a case where a distance between the transmission source host and the transmission destination host is long (for example, in the case of Hokkaido and Okinawa), a distance between routers to be relayed also lengthens. In this case, when the number of routers included in the detection path is less than the prescribed number, there may be a case where the transmission source user terminal does not actually exist in the area in the extent identified corresponding to the number of routers. Therefore, the area identifying unit 12 may present an index value indicating the level of possibility that the user terminal actually exists in the identified area (in other words, the certainty of area estimation) by performing the following processing.

That is, the area identifying unit 12 identifies the area of the prefectural unit corresponding to each of the IP addresses, with reference to the area database, on the basis of the IP address of each of the routers included in the detection path, and identifies the distance between the routers. In such a case, the distance, for example, is a distance between prefectural seats, and is an already-known value. The possibility that the user terminal actually exists in the area identified on the basis of the IP address of the router at the end of the detection path decreases as the distance lengthens. Therefore, the area identifying unit 12 presents the index value set in advance corresponding to the length of the identified distance, along with information of the identified area. Note that, the distance between the routers that is used at the time of determining the index value may be a distance between the router at the end of the detection path and the router next to it.

Note that, in the embodiment described above, an examples has been described in which the path search command is executed by designating the transmission destination host, and thus, the communication path from the transmission destination host up to the transmission source host is searched in the direction opposite to the transmission direction, and the area in which the transmission source user terminal (the router directly below the transmission source user terminal) is used is identified from the IP address of the router at the end of the detected communication path, but the invention is not limited thereto. For example, the path search command is executed by designating the transmission source host, and thus, a communication path from the transmission source host up to the transmission destination host can be searched in a forward direction, and an area in which the transmission destination user terminal (a router directly below the transmission destination user terminal) is used can also be identified from the IP address of the router at the end of the detected communication path.

In addition, in the embodiment described above, an example has been described in which in a case where the number of routers included in the communication path detected by the communication path detection unit 11 is 5, the area of the prefectural unit is identified, in a case where the number of routers is 4, the area of the district unit is identified, in a case where the number of routers is 3, the area of the district group unit is identified, and in a case where the number of routers is 2 or less, the area of the country unit is identified, but this is merely an example.

In addition, the embodiment described above is merely a specified example for implementing the invention, and thus, the technical scope of the invention should not be construed in a limited manner. That is, the invention can be implemented in various manners without departing from the gist or the main characteristics thereof.

REFERENCE SIGNS LIST

11 Communication path detection unit
12 Area identifying unit
13 Path recording unit
14 Area database storage unit
15 Path database storage unit

The invention claimed is:

1. An IP address use area identifying system, characterized by comprising:
   a communication path detection unit detecting a communication path including router passing information by executing a path search command; and
   an area identifying unit identifying an area from an IP address of a router located at an end of the communication path detected by the communication path detection unit, with reference to an area database storing IP address use area information in which the IP address is associated with the area in which the IP address is used,
   wherein when a number of routers included in the communication path detected by the communication path detection unit is a prescribed number, the area identifying unit identifies an area stored in the area database, whereas when the number of routers included in the communication path is less than the prescribed number, the area identifying unit identifies an area wider than the area stored in the area database, and at this time, the area identifying unit increases an extent of the area that is identified as the number of routers included in the communication path decreases.

2. The IP address use area identifying system according to claim 1, characterized by further comprising:
   a path recording unit storing information of the communication path detected by the communication path detection unit in a path database, every time the communication path is detected,
   wherein when the number of routers included in a detection path that is the communication path detected by the communication path detection unit is less than the prescribed number, the area identifying unit identifies an area in an extent excluding an area corresponding to an IP address of a router located on a path that is ahead of the end of the detection path, in the communication path that is stored in the path database and is partially common to the detection path, in an area in an extent corresponding to the number of routers.

* * * * *